No. 628,126. Patented July 4, 1899.
H. F. SHAW.
FLEXIBLE SHAFT COUPLING.
(Application filed July 16, 1898.)
(No Model.)
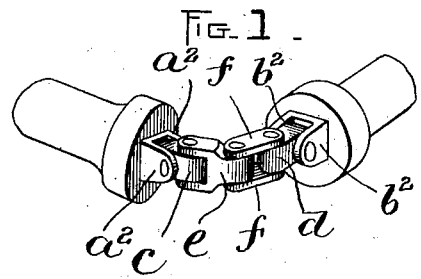
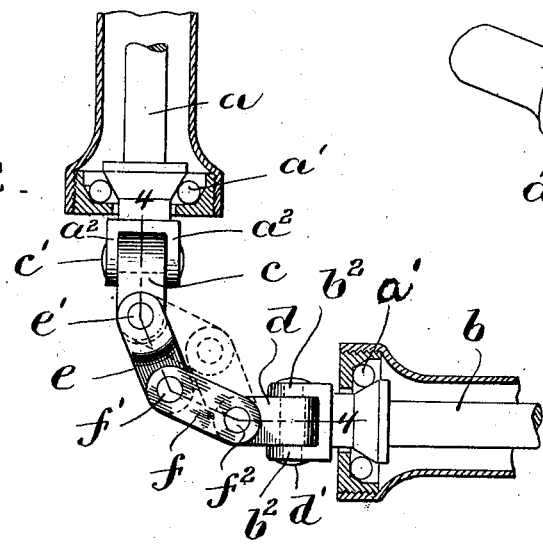
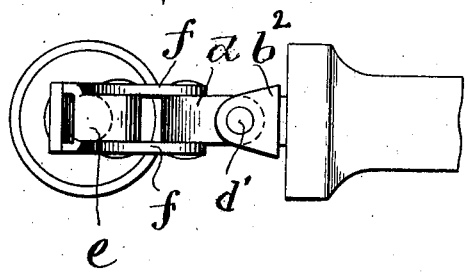
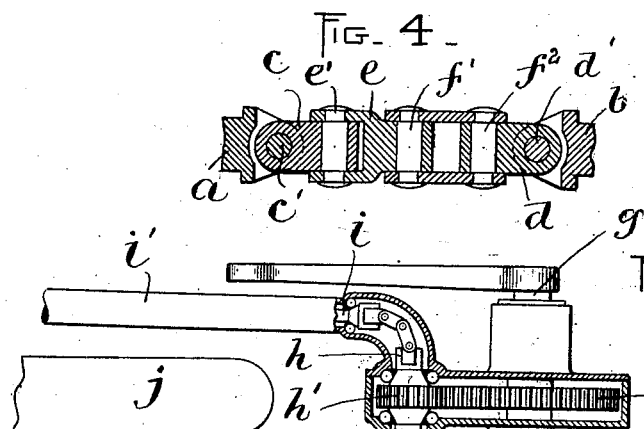
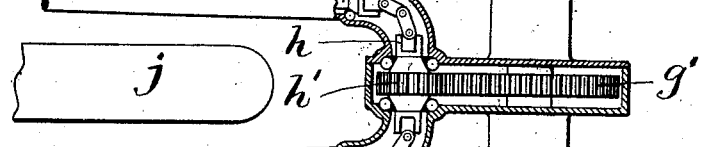
Witnesses:
A. D. Harrison.
P. K. Bezzetti.
Inventor:
Henry F. Shaw
by Wright Brown & Quinby
attys.

UNITED STATES PATENT OFFICE.

HENRY F. SHAW, OF BOSTON, MASSACHUSETTS.

FLEXIBLE SHAFT-COUPLING.

SPECIFICATION forming part of Letters Patent No. 628,126, dated July 4, 1899.

Application filed July 16, 1898. Serial No. 686,138. (No model.)

*To all whom it may concern:*

Be it known that I, HENRY F. SHAW, of Boston, in the county of Suffolk and State of Massachusetts, have invented certain new and useful Improvements in Flexible Shaft-Couplings, of which the following is a specification.

This invention has relation to couplings for transmitting power between unalined shafts; and its object is to provide a coupling having considerable rigidity or resistance to torsional strain and one which will allow of a certain amount of adjustment of the shafts.

The invention consists in the novel features of construction and arrangement which I shall now proceed to describe and claim.

Of the accompanying drawings, forming a part of this specification, Figure 1 represents a perspective view of a shaft-coupling constructed in accordance with my invention. Fig. 2 represents a top plan view thereof with the shaft-bearings in section. Fig. 3 represents an elevation. Fig. 4 represents a section on line 4 4 of Fig. 2. Fig. 5 represents a sectional plan view showing an application of my invention.

The same reference characters indicate the same parts in all the figures.

Referring to the drawings, $a$ and $b$ designate two shafts mounted, in the present instance, at right angles to each other and housed in suitable bearings $a'$ $a'$, which prevent longitudinal movement of the shafts. The head or end of each shaft is bifurcated or formed with ears $a^2$ $a^2$ $b^2$ $b^2$, between which end links $c$ $d$ are pivoted on pintles $c'$ $d'$. $e$ is a link pivoted to one end of the end link $c$ and having a bifurcated end which embraces said link and supports a pintle $e'$, passing through an aperture in the link $c$. The other end of the link $e$ is connected with the link $d$ by means of two link-plates $f$ $f$, supporting pintles $f'$ $f^2$, which extend through apertures in the end links $e$ and $d$, respectively. The parts $e f f$ constitute intermediate links.

When a torsional or rotary motion is given either of the shafts $a$ or $b$, the motion is transmitted through the four links $c$, $e$, $f f$, and $d$ and the connecting-pintles of the couplings to the other shaft, which is thereby rotated.

The full lines in Fig. 2 show a position of the links $e f$ at one point in the revolution of the shafts, and the dotted lines show the position of said links when the shafts are turned through a half-revolution from said point. In passing from one of these positions to the other the links $c$ $d$ turn on the pintles $c'$ $d'$, and the distance between the alternate ends of the pintles $e'$ $f^2$ alternately increases and decreases, said pintles being offset from the pintles $c'$ and $d'$, on which the links $c$ $d$ turn or swing. This variation of distance between the ends of the pintles $e'$ $f^2$ is compensated for by the described arrangement of the links and pintles, said arrangement permitting a lateral flexure of the coupling in any direction, so that the variations in distance above referred are compensated for. Without such compensation the shafts, when confined against endwise movement, could not rotate freely.

As above mentioned, the link connections $e f$ are adapted to yield laterally. This construction compensates for the approach toward and recession from each other of the ends of the pintles $e'$ $f^2$, and thus permits of the use of pintles of such length as is necessary in order that the device may possess sufficient strength to effect the rotation of the driven shaft even when there is considerable resistance thereto, as in the case of the driven wheel of a bicycle when hill-climbing. The longer the construction of the pintles and the lesser the number employed the greater is the strength of the coupling. It is obvious that with a large number of links the wear is greater and the strength is less, and there is liability of a twisting or torsional effect, having a tendency to draw or force one of the shafts longitudinally, and when the pintles employed are very short the leverage about the axis of rotation is reduced, as is obvious.

My invention has many useful applications which need not be individually illustrated or described.

Fig. 5 represents the invention as applied to the propulsion of a bicycle. $g'$ is a spur-gear on the crank-shaft $g$ of the bicycle, and $h'$ is a spur-pinion on a parallel shaft $h$. $i$ $i$ are two shafts extending through the lower frame-bars $i'$ $i'$ of the bicycle on either side of the rear wheel $j$. The shafts $i$ $i$ are connected with the ends of the shaft $h$ by means of my improved flexible coupling, and similar couplings may be used to connect the rear ends of the shafts $i$ with the hub of the rear wheel. Upon turning the crank-shaft $g$ in a forward direction the pinion $h'$ is rotated in an opposite direction, and in passing through the couplings and the shafts $i\ i$ the motion is reversed and the rear wheel is revolved in a forward direction.

I am aware that flexible couplings have been constructed in which the equivalents of the links or blocks $c\ d$ have been employed and a single link used to connect said links. In this form of coupling, however, the distance between the ends of the shafts cannot be varied even slightly without greatly increasing the running friction of the coupling. My improved coupling overcomes this objection, since it is obvious that the two links $e$, $f$, pivoted together at $f'$, will allow of some variation in the distance between the ends of the shafts $a\ b$. This feature is important in allowing the shafts to be adjusted in their bearings.

I claim—

A coupling for unalined shafts, comprising a pivot at the end of each shaft, a block connected with each pivot and free to oscillate only in a plane at right angles to said pivot, and laterally-yielding link connections forming the sole means for connecting the two blocks, said link connections being pivoted to the first-mentioned pivoted blocks and rigid against flexure in one direction and yielding in the direction of a plane at a right angle to the plane of oscillation of said pivoted blocks.

In testimony whereof I have affixed my signature in presence of two witnesses.

HENRY F. SHAW.

Witnesses:
A. D. HARRISON,
C. F. BROWN.